United States Patent
Kim et al.

(10) Patent No.: US 9,515,520 B1
(45) Date of Patent: Dec. 6, 2016

(54) BATTERY BACKUP BASED ON VOLTAGE FEED-FORWARD CONTROL IN A POWER SUPPLY

(75) Inventors: Sangsun Kim, San Jose, CA (US); Ken Krieger, Jackson, WY (US)

(73) Assignee: Google Inc., Mountain View, CA (US)

( * ) Notice: Subject to any disclaimer, the term of this patent is extended or adjusted under 35 U.S.C. 154(b) by 975 days.

(21) Appl. No.: 13/566,556

(22) Filed: Aug. 3, 2012

(51) Int. Cl.
  *H02J 9/06* (2006.01)
  *H02J 9/00* (2006.01)

(52) U.S. Cl.
  CPC ..................... *H02J 9/062* (2013.01)

(58) Field of Classification Search
  CPC .............. H02J 9/062; H02J 9/061; H02J 9/06; H02J 7/34; G06F 1/30; G01R 31/3606; G01R 31/3648; G01R 19/16542
  USPC ..................................................... 307/40–77
  See application file for complete search history.

(56) References Cited

U.S. PATENT DOCUMENTS

| | | | | |
|---|---|---|---|---|
| 4,553,081 A | * | 11/1985 | Koenck ................. | G01R 31/36 320/131 |
| 5,458,991 A | | 10/1995 | Severinsky | |
| 5,712,779 A | * | 1/1998 | Sheppard .............. | H04M 19/00 361/614 |
| 5,939,798 A | * | 8/1999 | Miller .................... | H02J 9/062 307/43 |
| 6,304,006 B1 | * | 10/2001 | Jungreis ........................ | 307/64 |
| 6,624,635 B1 | * | 9/2003 | Lui ....................... | H02J 7/0022 324/426 |
| 6,796,833 B2 | | 9/2004 | Baker | |
| 6,850,036 B2 | | 2/2005 | Lin et al. | |
| 7,386,743 B2 | | 6/2008 | Bahali et al. | |
| 7,394,674 B2 | | 7/2008 | Huang | |
| 7,518,265 B2 | * | 4/2009 | Roepke ................... | G06F 1/30 307/64 |
| 7,550,873 B2 | * | 6/2009 | Jiang ...................... | H02J 9/061 307/64 |
| 7,566,988 B2 | * | 7/2009 | Heber .................... | H02J 9/062 307/44 |
| 7,667,351 B2 | * | 2/2010 | Marwali ................. | H02J 9/062 307/87 |
| 7,715,215 B1 | | 5/2010 | Bosco et al. | |
| 7,737,580 B2 | | 6/2010 | Hjort et al. | |
| 7,948,778 B2 | | 5/2011 | Pfitzer et al. | |
| 8,009,450 B2 | | 8/2011 | Royak et al. | |

(Continued)

OTHER PUBLICATIONS

Furata, "Server Chassis and Triplet Hardware v1.0," Apr. 7, 2011, 10 pages, Open Compute Project.

(Continued)

*Primary Examiner* — Jared Fureman
*Assistant Examiner* — Michael Warmflash
(74) *Attorney, Agent, or Firm* — Fish & Richardson P.C.

(57) ABSTRACT

The subject innovation relates to providing battery backup for a power supply (e.g., a power supply implemented within a distributed power architecture where multiple power supplies are coupled together) based at least in part on voltage feed-forward control. A backup converter is coupled to a battery and a primary power converter. The backup converter delivers power from the battery to a load when a primary power failure is detected in the primary power converter. A controller controls an output current level of the backup converter based on an output voltage level of the battery.

19 Claims, 3 Drawing Sheets

(56) References Cited

U.S. PATENT DOCUMENTS

| | | | |
|---|---|---|---|
| 8,116,105 B2* | 2/2012 | Klikic | H02J 9/062 363/132 |
| 8,193,662 B1 | 6/2012 | Carlson et al. | |
| 8,304,929 B2* | 11/2012 | Sweet | H02J 7/1438 307/9.1 |
| 2002/0153865 A1 | 10/2002 | Nelson et al. | |
| 2006/0050465 A1* | 3/2006 | Cho et al. | 361/118 |
| 2011/0304211 A1 | 12/2011 | Peterson et al. | |

OTHER PUBLICATIONS

Sarti, "Battery Cabinet Hardware v1.0," Apr. 7, 2011, 13 pages, Open Compute Project.

* cited by examiner

BATTERY BACKUP BASED ON VOLTAGE FEED-FORWARD CONTROL IN A POWER SUPPLY

TECHNICAL FIELD

The subject disclosure relates to power systems and more particularly to providing battery backup in a power system based on voltage feed-forward control.

BACKGROUND

Uninterruptible Power Supply (UPS) functionality is commonly used in conventional power systems to protect computers, data centers, telecommunication equipment or other electrical equipment from unexpected power disruptions that can cause injuries, fatalities, serious business disruptions or data loss. Typically, the UPS functionality provides instantaneous or near-instantaneous protection from primary power interruption. Specifically, when primary power, for example, mains power, becomes unavailable, the backup power sources of the UPS, for example, a group of batteries or battery packs, immediately power the load for at least a sufficient amount of time for the primary power to become available again, auxiliary power to come on line, or to properly shut down the protected equipment.

In a distributed UPS system, multiple backup power sources can be implemented in parallel (e.g., output current sharing can be implemented to power the load). As such, a uniform level of power can be provided to the load from each backup power source. However, in such a scenario, a weaker backup power source among the multiple backup power sources can become completely drained (e.g., the weaker backup power source can shut off output to the load). Therefore, the other remaining backup power sources are then required to produce higher backup current to power the load. Consequently, the remaining backup power sources may not deliver the output power to the load for an adequate amount of time. Therefore, conventional power systems and methods may cause unnecessary drainage of backup power sources and/or do not properly manage backup power usage.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular implementations of the specification, or any scope of the claims. Its sole purpose is to present some concepts of the specification in a simplified form as a prelude to the more detailed description that is presented later.

In accordance with an implementation, a system includes a backup converter and a controller. The backup converter is coupled to a battery and a primary power converter. Furthermore, the backup converter delivers power from the battery to a load when a primary power source failure is detected in the primary power converter. The controller controls an output current level of the backup converter based on an output voltage level of the battery (or an output voltage level across the battery).

Additionally, a non-limiting implementation provides for setting a threshold value for a battery, measuring an output voltage level provided by the battery, and controlling an output current level provided by the battery based at least in part on the output voltage level provided by the battery.

Furthermore, a non-limiting implementation provides for powering a load with a primary power source, delivering power from a battery to the load when a primary power failure is detected at the primary power source, and controlling an output current level provided to the load based on an output voltage level of the battery.

DETAILED DESCRIPTION

Figure 1:
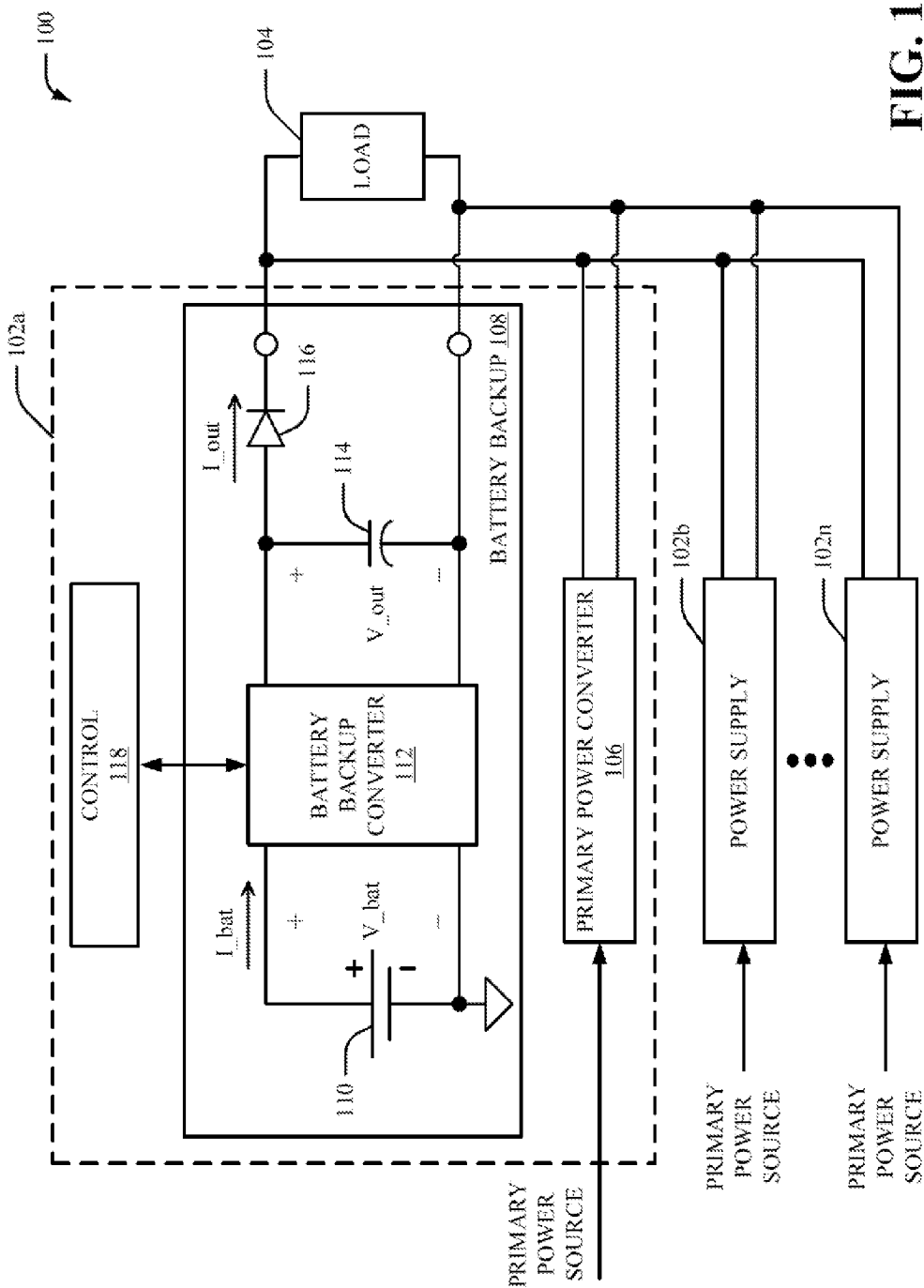
FIG. 1 illustrates an exemplary power supply system in which techniques of the subject disclosure can be implemented.

Implementations of the subject disclosure are described below with references to the above drawings, wherein like reference numerals are used to refer to like elements throughout. In the following description, for purposes of explanation, numerous specific details are set forth in order to provide a thorough understanding of the subject disclosure. It is to be appreciated, however, that the innovation can be practiced without these specific details. In other instances, well-known structures and devices are shown in block diagram form in order to facilitate describing the subject disclosure.

According to an aspect of the subject disclosure, systems and methods disclosed herein provide battery backup based on voltage feed-forward control in a power supply system. An Uninterruptible Power Supply (UPS) can include a backup power source (e.g., a battery) which can power a load via a backup converter when a primary power source is unavailable. The backup converter can be implemented in parallel with one or more other backup converters within a distributed power architecture. As such, in conventional UPS systems, a uniform level of power can be provided to the load from each backup power source. However, in such a scenario, a weaker backup power source among the multiple backup power sources can become completely drained (e.g., the weaker backup source can stop providing power to the load). Therefore, the other remaining backup power sources are then required to produce higher current to power the load. Consequently, the remaining backup power sources may not deliver the output power to the load for an adequate amount of time. Therefore, conventional power systems and methods can cause unnecessary drainage of backup power sources and/or do not properly manage backup power usage.

To that end, techniques for implementing feed-forward control to regulate output voltage of backup converters in distributed power architecture are presented. Systems and methods disclosed herein relate to feed-forwarding battery voltage so that a backup converter with a lower battery voltage (e.g., a battery voltage level below a predetermined voltage level) delivers less output current to the load. The amount of current provided by a battery can be modulated based on the voltage provided by the battery. As such, the amount of power provided by each battery in distributed power architecture can be varied (e.g., different batteries in the distributed power architecture can provide different amounts of power). Therefore, a weaker battery in distributed power architecture can continue to contribute power to the load without becoming fully drained. As a result, overall battery backup reliability can be improved.

Referring initially to FIG. 1, there is illustrated an example system 100 that provides controlled battery backup power for a load, according to an aspect of the subject disclosure. The system 100 can be implemented as a distributed power system. Specifically, the system 100 can provide a feed-forward control feature that can be utilized in most any backup power supply application. The system 100 can be employed by various systems, such as, but not limited to, power supply systems, data center systems, network systems, computer network systems, communication systems, router systems, data center systems, server systems, high availability server systems (e.g., Telecom server systems), Web server systems, file server systems, media server systems, disk array systems, powered insertion board systems, and the like.

In particular, the system 100 shown in FIG. 1 includes one or more power supplies 102a-n and a load 104. For example, the power supplies 102a-n can each be implemented as a UPS. Each of the one or more power supplies 102a-n includes a primary power converter 106, a battery backup 108 and a control component (e.g., controller) 118. For example, the control component 118 can be implemented as a battery voltage feed forward control component. The battery backup 108 includes a battery (e.g., a backup power source) 110 and a battery backup converter 112. The battery 110 can include one or more batteries or one or more battery-packs. In one example, the battery 110 may be integral to the battery backup converter 112. In other example, the battery 110 may be external to the battery backup converter 112. In one implementation, the battery backup 108 also includes a capacitor 114 and an ORing diode 116. In FIG. 1, V_bat is the voltage provided by the battery 110, I_bat is the current provided by the battery 110, V_out is the voltage provided by the battery backup converter 112 and I_out is the current provided by the battery backup converter 112.

The outputs of the power supplies 102a-n are coupled to the load 104 electrically in parallel with each other. The load 104 is thus concurrently powered by the power supplies 102a-n. Under normal operating conditions, the power supplies 102a-n provide power from the primary power source (e.g., PRIMARY POWER SOURCE shown in FIG. 1). The primary power source can include an alternating current (AC) power source (e.g. 120 VAC or 240 VAC) or a direct current (DC) power source. The primary power source is coupled to the primary power converter 106, which can include an AC-DC converter or a DC-DC converter depending on the primary power source. The primary power converter 106 can include buck converters, boost converters, buck-boost converters or a combination thereof. The battery backup converter 112 (e.g., the battery 110) can provide power (e.g., backup power) to the load 104 when a primary power source failure is detected in the primary power converter 106 (e.g., in relation to the primary power converter 106).

The load 104 can be a data center or a server in a data center. The load 104 can include one or more constant power loads. For example, the load 104 can include one or more servers (e.g., one or more critical loads). Additionally or alternatively, the load 104 can include one or more non-server loads (e.g., one or more non-critical loads).

The capacitor 114 can be implemented to regulate voltage delivered to the load 104. The ORing diode 116 can be implemented as an electrical network (e.g., an ORing Network). The ORing diode 116 can be designed to prevent output current of a battery backup converter 112 (e.g., within the power supply 102a) from flowing into an output port of another battery backup converter 112 (e.g., within one of the power supplies 102b-n), and vice versa. The ORing diode 116 may be implemented through the use of semiconductor diodes or other circuitry designed for such purposes.

The battery backup converter 112 can be communicably coupled for digital, analog, optical or another form of communication with the control component 118. For example, the control component 118 can control operation of the battery backup converter 112. In one example, the control component 118 can be implemented as a microcomputer or a microcontroller. The battery backup converter 112 can include digital, analog or optical interfaces for communicating with the control component 118. The control component 118 can be implemented in hardware, software, firmware, or some combination thereof.

The control component 118 can be programmed to adjust (or set) the output levels of the battery backup converter 112 to various levels, thereby controlling the level of the output voltage and/or current supplied by the battery backup converter 112. For example, the control component 118 can control the output current of the battery 110 (e.g., via the battery backup converter 112) based on the output voltage of the battery 110 (e.g., the output voltage level across the battery 110) and/or the battery backup converter 112. The control component 118 can balance battery currents among the power supplies 102a-n via droop control, for example, if battery voltage (e.g., voltage of a battery 110 in either of the power supplies 102a-n) is above a predetermined threshold level. Moreover, the control component 118 can be utilized to control and/or query instrumentation that measures the various attributes (e.g., current and/or voltage) of the battery 110.

The control component 118 can implement feed-forward control to regulate output voltage of the battery backup converter 112. The output voltage of the battery 110 can be feed-forwarded (e.g., via the control component 118 to the battery backup converter 112) so that the battery backup converter 112 can deliver less output current to the load 104 if the voltage of the battery 110 reaches a predetermined threshold level. Therefore, if the battery 110 cannot provide full output current, the current drawn from the battery 110 can be reduced to a level where the output voltage of the battery 110 can adequately provide some current to the load 104 (e.g., less than full output current). Accordingly, voltage measured at the terminals of the battery 110 can be feed-forwarded to the battery backup converter 112. As such, the battery backup converter 112 can decrease the current demand from the battery 110, thereby allowing the voltage of the battery 110 to rise. For example, feed-forward control can be implemented in response to a determination that the output voltage level of the battery 110 (e.g., the output voltage level across the battery 110) is below a threshold voltage level of the battery 110. In one example, a particular battery backup converter 112 with a low battery voltage (e.g., with respect to other battery backup converters 112 in the system 100) can deliver less output current than other backup converters 112. Additionally or alternatively, the control component 118 can balance battery currents among the power supplies 102a-n (e.g., by implementing droop control) if the battery voltage of one or more of the power supplies 102a-n is above the predetermined threshold level.

Therefore, the amount of current provided by the battery 110 can be varied based on the voltage of the battery 110 (e.g., voltage present at the terminals of the battery 110). As such, the amount of power provided by each battery 110 in the system 100 (e.g., in each power supply 102a-n) can be varied (e.g., the capacity level of each battery 110 in the system 100 can be regulated). For example, different batteries in each power supply 102a-n can provide different amounts of power to the load 104. Therefore, a weaker battery in the system 100 can continue to contribute power to the load 104 without becoming fully drained. As such, overall battery backup reliability in the system 100 can be improved.

In one implementation, the control component 118 is implemented outside the battery backup converter 112. In another implementation, the control component 118 is implemented inside the battery backup converter 112. It is to be appreciated that the control component 118 can be implemented as one or more controllers. Additionally, it is to be appreciated that a reference to a power source powering a load in the subject disclosure covers the implementation in which the power source is coupled to the load by way of a converter as well as the implementation in which the power source is coupled to the load by way of a switch.

Figure 2:
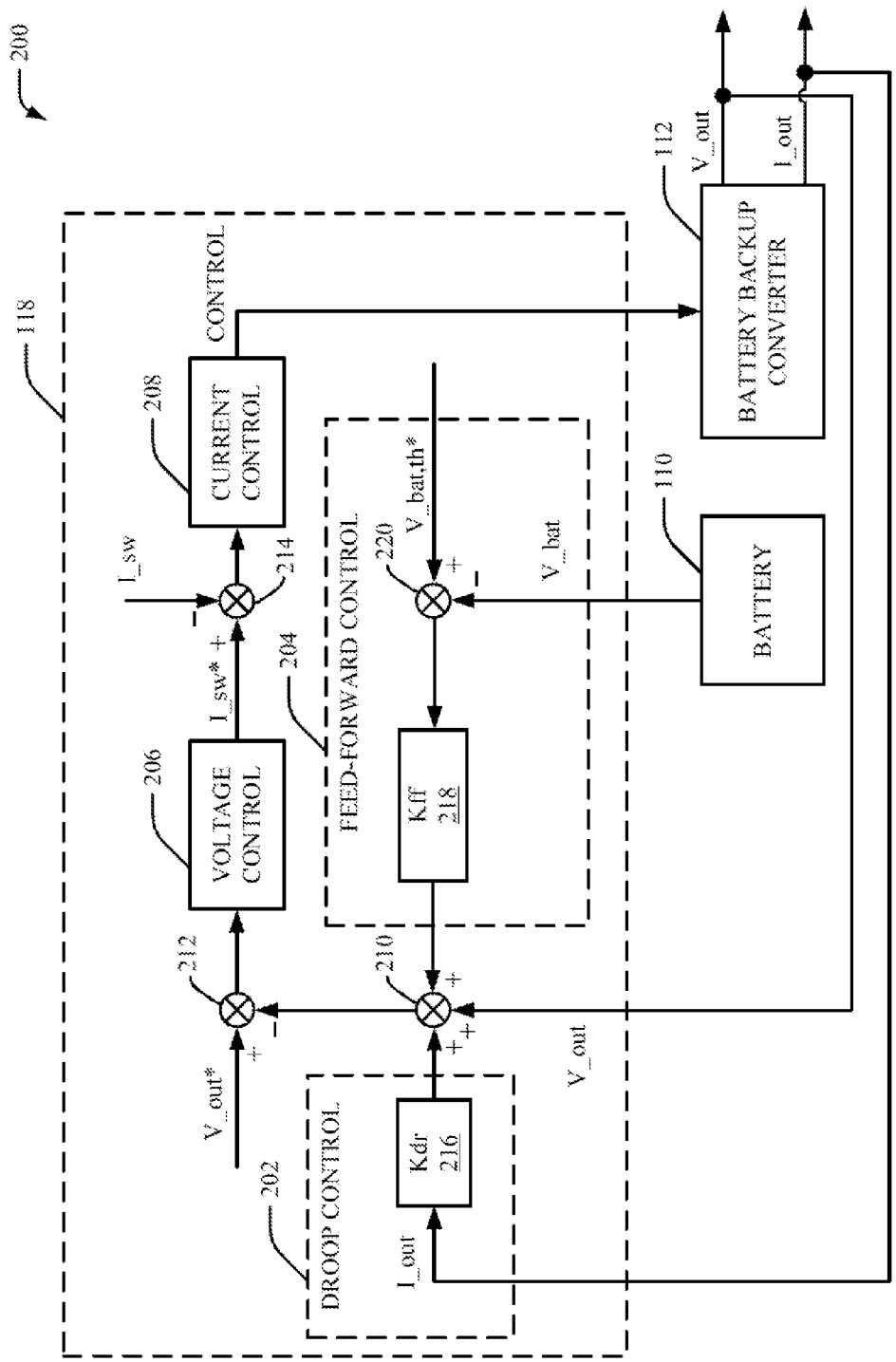
FIG. 2 illustrates an exemplary implementation of battery voltage feed forward control, according to an aspect of the subject disclosure.

Referring now to FIG. 2, there is illustrated an example system 200 that provides voltage feed-forward control. The system 200 includes the battery 110, the battery backup converter 112 and the control component 118. The control component 118 includes droop control (e.g., a droop control component) 202, feed-forward control (e.g., a feed-forward control component) 204, voltage control (e.g., a voltage control component) 206 and current control (e.g., a current control component) 208. The control component 118 also includes a summing point (e.g., a summing component) 210, a summing point (e.g., a summing component) 212 and a summing point (e.g., a summing component) 214. The droop control 202 includes a Kdr component 216. The feed-forward control 204 includes a Kff component 218 and a summing point (e.g., a summing component) 220.

The feed-forward control 204 can adjust the battery 110 to deliver less power to the load 104. For example, it can be determined whether the battery 110 is a weak battery by comparing the voltage level of the battery 110 to a threshold value of the battery 110. As such, the feed-forward control 204 may implement feed-forward control when the voltage of the battery 110 (e.g., V_bat shown in FIG. 2) is less than the battery threshold voltage (e.g., V_bat,th shown in FIG. 2). Therefore, the output current level provided by the battery 110 can be reduced in response to a determination that the output voltage level of the battery 110 (e.g., the output voltage level across the battery 110) is below the threshold voltage level of the battery 110 (e.g., in response to a determination that the battery 110 is a weak battery). In response to a determination that the battery 110 is not a weak battery (e.g., the output voltage level of the battery 110 is at or above the battery threshold voltage), the output current level provided by the battery 110 (e.g., the output current levels of each of the battery backup converters 112) can be determined by the droop control 202. As such, the voltage of the battery 110 can be varied (e.g., via the droop control 202) to find and/or maintain a more advantageous output current for the battery 110. The summing point 220 can determine whether the battery voltage is less than the battery threshold voltage. The Kff component 218 can be implemented as a gain in the feed-forward control 204. In one example, the feed-forward control 204 is not applied (e.g., or turned off) in response to a determination that the output voltage level of the battery 110 is above the threshold voltage level of the battery 110. For example, a different current sharing technique can be implemented (e.g., a layer can be removed from the control mechanism of the control component 118).

The output voltage of the battery backup converter 112 can be regulated by comparing the reference voltage (e.g., V_out* shown in FIG. 2) to the sum of the output voltage (e.g., V_out shown in FIG. 2), the output voltage of the droop control 202 and the output voltage of the feed-forward control 204. The sum of the output voltage, the output voltage of the droop control 202 and the output voltage of the feed-forward control 204 can be calculated at the summing point 210 (e.g., determined by the summing component 210). The reference voltage can be compared to the sum of the output voltage, the output voltage of the droop control 202 and the output voltage of the feed-forward control 204 at the summing point 212 (e.g., the comparison can be determined by the summing component 212). Therefore, the summing point 212 can be implemented to regulate output voltage of the battery backup converter 112 (e.g., adjust output voltage level of the battery backup converter 112).

The droop control 202 can provide stability (e.g., voltage stability) for changes in voltage provided to the load 104. For example, the droop control 202 can be implemented to adjust a control signal (e.g., CONTROL) that drives the battery backup converter 112. The output voltage of the droop control 202 is proportional to the output current (e.g., Lout shown in FIG. 2) of the battery backup converter 112. The droop control 202 can share the output current among the power supplies 102a-n (e.g., to facilitate potentially unequal sharing of the current of the load 104). If the battery voltages from the power supplies 102a-n are normal (e.g., above a predetermined voltage threshold level), the droop control 202 can share the output currents (to balance battery output currents) of the power supplies 102a-n. For example, the droop control 202 can adjust the control signal (e.g., implement droop sharing) to balance the output current levels of the battery backup converters 112 implemented in parallel. As such, droop control can be implemented to control the output current levels of the battery backup converters 112. Therefore, the voltage level of the battery 110 in each of the power supplies 102a-n can be varied (e.g., by a unique amount) to find and/or maintain a more advantageous output current level for the battery 110 in each of the power supplies 102a-n. The Kdr component 216 can be implemented as a scale factor in the droop control 202.

The voltage controller 206 can produce the reference current (e.g., I_sw* shown in FIG. 2) for the battery backup converter 112. The current controller 208 can drive the battery backup converter 112 with a control signal (e.g., CONTROL shown in FIG. 2). For example, the control signal can be implemented as a pulse width modulation (PWM) control signal. Therefore, the output current level provided to the load 104 by the battery backup converter 112 can be controlled via PWM.

The reference current I_sw* can be compared to switch current (e.g., I_sw shown in FIG. 2). For example, the switch current I_sw can be a switch current in the battery backup converter 112. The reference current I_sw* can be compared to switch current I_sw at the summing point 214 (e.g., the comparison can be determined by the summing component 214).

In one implementation, the battery backup converter 112 can limit output current of the battery 110. For example, the battery backup converter 112 can limit output current of the battery 110 so that the output current of the battery 110 does not exceed 100% output current. Therefore, a weaker battery in the system 100 can begin to increase the amount of backup power provided to the load 104 (e.g., a weaker battery in the system 100 is able to provide a greater amount of power to the load 104).

Figure 3:
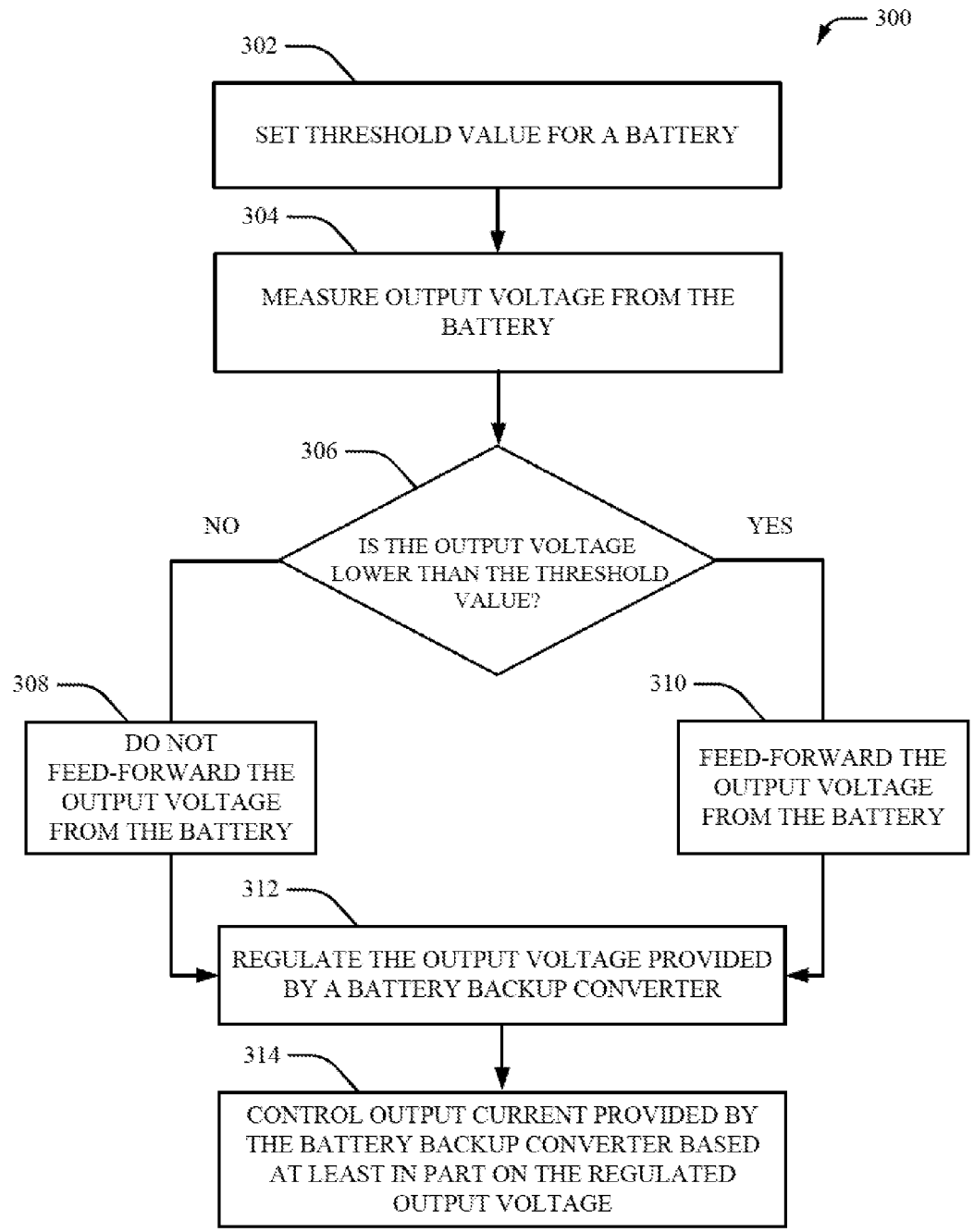
FIG. 3 illustrates an exemplary methodology for implementing voltage feed-forward control, according to an aspect of the subject disclosure.

FIG. 3 illustrates an example methodology for implementing voltage feed-forward control, according to an aspect of the subject disclosure. According to methodology flow diagram 300, at 302, a threshold value for a battery is set (e.g., using a control component 118). For example, a threshold voltage value for the battery 110 can be set. At 304, output voltage from the battery is measured (e.g., using a control component 118). For example, the output voltage level across the battery is measured. At 306, it is determined (e.g., using feed-forward control 204) whether the output voltage is lower than the threshold value. For example, the feed-forward control 204 can determine whether the output voltage from the battery 110 is lower than the set threshold value for the battery 110. If no, at 308, the output voltage from the battery is not feed-forwarded (e.g., by feed-forward control 204). For example, it can be determined that the battery 110 is not a weak battery. If yes, at 310, the output voltage from the battery is feed-forwarded (e.g., by feed-forward control 204). For example, it can be determined that the battery 110 is a weak battery.

At 312, the output voltage provided by a battery backup converter is regulated (e.g., by a control component 118). For example, the output voltage of the battery backup converter 112 can be regulated by comparing a reference voltage for the battery backup converter 112 to the sum of the output voltage of the battery backup converter 112 and the output of the droop control 202 if the output voltage from the battery 110 is not feed-forwarded. In another example, the output voltage of the battery backup converter 112 can be regulated by comparing a reference voltage for the battery backup converter 112 to the sum of the output voltage of the battery backup converter 112, the output of the droop control 202 and the output of the feed-forwarded control 204 if the output voltage from the battery 110 is feed-forwarded. At 314, the output current provided by the battery backup converter is controlled (e.g., using a current control component 208) based at least in part on the regulated output voltage. For example, a control signal (e.g., a PWM control signal) to drive the battery backup converter 112 can be controlled based at least in part on the regulated output voltage of the battery backup converter 112.

It is to be appreciated that the testing methodology and sequence illustrated in FIG. 3 is exemplary and other methodologies and sequences can be implemented by using the techniques of the subject disclosure. The methodology 300 discussed above can be managed by using a programmable microcontroller. According to an aspect of the present invention, the methodology 300 can be interrupted prior to the completion of all acts, for example, to return the power system to normal operation (i.e. wherein only the primary power sources power the load) in response to the occurrence of a predetermined condition. The microcontroller can be programmed to store information in memory indicating which acts of the methodology 300 were not completed at the time of the interruption, and the microcontroller can be programmed to complete those remaining acts later on at a suitable time.

What has been described above includes examples of the implementations. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
    a battery;
    a backup converter that powers an AC load by converting DC battery power when a power failure related to a primary power source is detected; and
    a controller coupled between the battery and the backup converter, the controller configured to:
        determine that a DC output voltage of the battery is below a threshold DC voltage; and
        in response to determining the DC output voltage is below the threshold DC voltage, reduce, based on the DC output voltage of the battery, a DC output current provided from the battery to the backup converter, while continuing to provide DC power output of the battery to the backup converter.

2. The system of claim 1, wherein the controller includes a feed-forward control component that compares the DC output voltage of the battery to the threshold DC voltage.

3. The system of claim 2, wherein the feed-forward control component decreases an output current of the backup converter in response to a determination that the DC output voltage of the battery is below the threshold DC voltage.

4. The system of claim 3, further comprising a plurality of batteries, wherein the controller controls the DC output current of each battery of the plurality of batteries in response to the determination that the DC output voltage of the battery is below the threshold DC voltage.

5. The system of claim 4, wherein the controller uniquely controls the DC output current of each battery of the plurality of batteries.

6. The system of claim 1, wherein an output voltage of the backup converter is regulated based on a reference voltage level of the backup converter.

7. The system of claim 1, wherein an output current of the backup converter is controlled via pulse width modulation (PWM).

8. The system of claim 1, wherein the backup converter and the controller are implemented within an Uninterruptible Power Supply (UPS) coupled to one or more other uninterruptible power supplies.

9. The system of claim 8, wherein the one or more other uninterruptible power supplies control an output current level of one or more other backup converters.

10. The system of claim 8, wherein the UPS and the one or more other uninterruptible power supplies are implemented within a distributed power system.

11. The system of claim 1, wherein:
the controller adjusts a control signal to control an output current level of the backup converter; and
the controller determines that the DC output voltage of the battery is below a threshold DC voltage by comparing the DC output voltage of the battery at an input of the controller to a reference voltage.

12. A method, comprising:
setting a threshold DC voltage value for a battery;
measuring a DC output voltage of the battery;
determining that the DC output voltage of the battery is below the threshold DC voltage; and
in response to determining the DC output voltage is below the threshold DC voltage value, reducing a DC output current of the battery based at least in part on the DC output voltage of the battery, while continuing to provide a DC power output of the battery to a backup converter that powers an AC load by converting the DC power output when a power failure related to a primary source is detected.

13. The method of claim 12, further comprising:
feed-forwarding the DC output voltage of the battery to control the DC output current provided by the battery.

14. The method of claim 12, further comprising:
comparing the DC output voltage of the battery to the threshold DC voltage value of the battery.

15. The method of claim 14, further comprising:
implementing droop sharing in response to a determination that the DC output voltage of the battery is above the threshold DC voltage.

16. The method of claim 12, further comprising:
adjusting a control signal to control the DC output current provided by the battery; and
determining that the DC output voltage of the battery is below a threshold DC voltage by comparing the DC output voltage of the battery at an input of the controller to a reference voltage.

17. The method of claim 12, further comprising:
powering AC load via the backup converter based on the DC output current provided by the battery.

18. The method of claim 12, wherein the reducing includes controlling the output current level provided by the battery via pulse width modulation (PWM).

19. A method, comprising:
powering a load with a primary power source;
delivering DC power from a battery to the load when a primary power failure is detected at the primary power source;
determining that a DC output voltage of the battery is below a threshold DC voltage; and
in response to determining the DC output voltage is below the threshold DC voltage, reducing a DC output current provided from the battery to the load based on the DC output voltage of the battery, while continuing to provide a DC power output of the battery to a backup converter that powers an AC load by converting the DC power output when a power failure related to the primary power source is detected.

* * * * *